Nov. 10, 1931. W. J. MacARTHUR 1,831,572
PUMP PACKING
Filed May 29, 1930 2 Sheets-Sheet 1

FIG. I

WILLIAM J. MacARTHUR.
INVENTOR
Paul W. Fritzman
ATTORNEY

Nov. 10, 1931.   W. J. MacARTHUR   1,831,572
PUMP PACKING
Filed May 29, 1930   2 Sheets-Sheet 2

WILLIAM J. MacARTHUR
INVENTOR
ATTORNEY

Patented Nov. 10, 1931

1,831,572

UNITED STATES PATENT OFFICE

WILLIAM J. MacARTHUR, OF LOS ANGELES, CALIFORNIA, ASSIGNOR OF ONE-HALF TO REA A. MAYNARD, OF LOS ANGELES, CALIFORNIA

PUMP PACKING

Application filed May 29, 1930. Serial No. 457,180.

My invention pertains to the art of packing the shafts of centrifugal pumps or the rods or plungers of reciprocating pumps to prevent the leakage of liquids therefrom. More specifically it pertains to the type of packings in which a solid metallic ring is used to surround the rod or shaft and in which leakage is prevented by a close fitting of the ring around the moving part and an end engagement of the ring with the inside end of the stuffing box in which the ring is placed.

An object of my invention is to provide a packing suitable for either high or low pressures and of such construction that it will be tight, durable and almost entirely free from friction.

In a copending application, filed May 29, 1930 under Serial No. 457,178 I have described and claimed a packing element having the same general structure and the present application refers to a specific modification of this device in which provision is made for the use of the packing at very high temperatures and in which provision is made for the lubrication of all rubbing surfaces.

Figure 1:
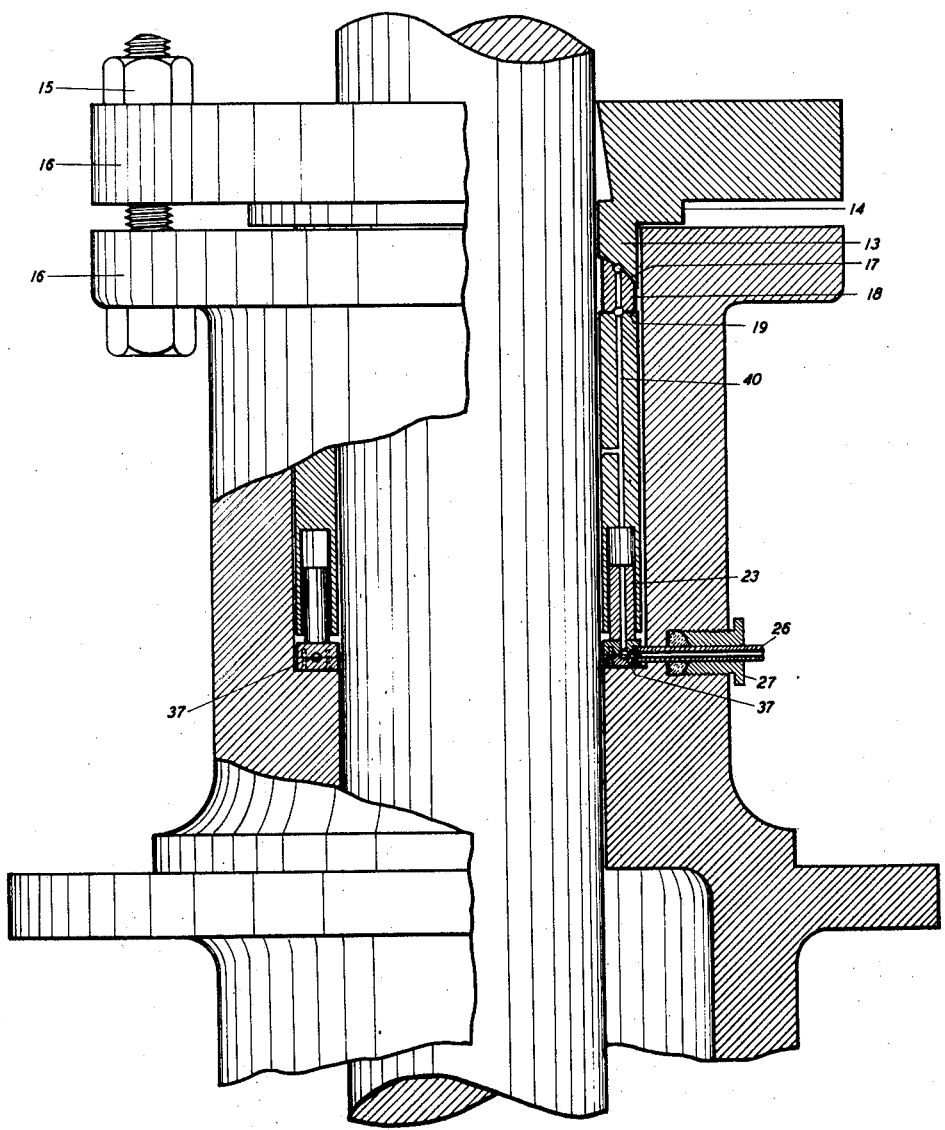
Figure 2:
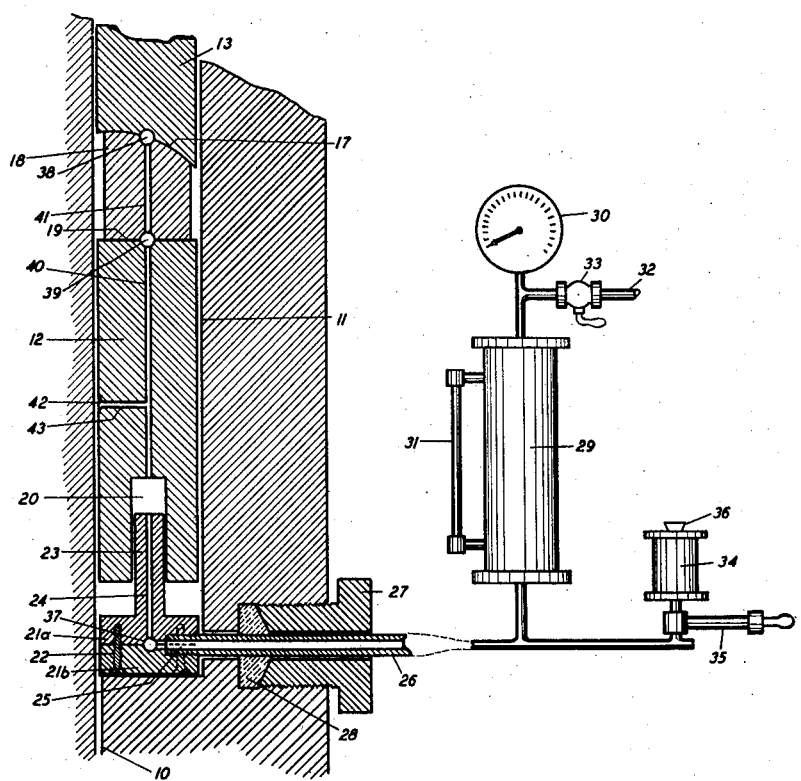

The objects and advantages of my invention will be evident on inspection of the attached drawings and the following description thereof, in which:

Figure 1 illustrates a pump end provided with a packer of my invention, with fluid actuated means for holding the packing ring in nonleaking contact with the end of the packing box and with means for lubricating certain contacting surfaces, and Figure 2 is a cross section on an enlarged scale of the floating ring indicated at 20 in Fig. 1.

Referring to Fig. 1, A is a pump rod which may be revolvable as in a centrifugal pump or reciprocating as in a plunger or piston pump, B is a broken portion of the pump end, C is the packing box and D a flanged gland attached thereto.

The inner end 10 of the packing box is bored to a loose fit over the rod A and the outer end 11 is bored to a greater diameter to accommodate the packing ring 12 and other elements about to be described. The inner face of the gland D is provided with a projection 13 fitting within the bore 11 and with a shoulder 14 having its inner face parallel to the squared outer face of the packing box. A copper or other gasket placed between this shoulder and the face of the box suffices to prevent leakage underneath the gland when the holding bolts 15 which pass through the flanges 16—16 are drawn tight.

The packing ring 12 is a solid, rigid ring of steel or other hard metal with squared and faced ends. This ring is a snug sliding fit on the rod and if not so fitted will not function to produce the results which I obtain. The outer diameter of the ring must be materially less than the inner diameter of the bore to allow for free lateral movement of the ring within the box. A radial clearance of $\frac{1}{32}''$ should be allowed in any case and in large units the radial clearance may be as much as $\frac{1}{16}''$.

The inner end of the projection 13 from the gland D is formed to the curvature of a spherical arc as at 17 and into this arcuate curvature is fitted a socket ring 18, having a correspondingly curved outer end and a flat faced inner end 19 engaging the outer end of the packing ring 12. The curved surfaces should be ground together to the best possible fit, as should also the flat faces. The inner diameter of the socket ring should be substantially greater than the diameter of the rod and the outer diameter should be substantially less than the diameter of the bore, so that the ring will not bind or cramp either on the rod nor in the bore in sliding on its arcuate bearing. It will be seen that in this combination the arcuate surfaces slide on each other with a ball and socket movement to permit distortion or whip of the rod while the faced outer end of the packing ring is free to move laterally over the faced inner end of the socket ring to compensate side movement of the rod.

While I have shown the arcuate faces on the outer end of the socket ring and the inner end of the projection from the gland, and have shown the flat faces on the inner end of the socket ring and the outer end of the packing ring, it should be understood that substantially the same results will be obtained if the outer end of the socket ring is formed flat and the arcuate curvature is formed at the inner end of the socket ring and the outer end of the packing ring.

During the discharge stroke of a reciprocating pump the packing ring 12 is held against the socket ring, and that against the gland, by the pressure of fluid within the pump. This pressure reverses in direction during the suction stroke and if the packing ring is not retained it will follow the rod to the other end of the box and will hammer violently at each reversal of direction.

In the copending application referred to I have shown retaining springs placed between the inner end of the packing and the end of the box, but springs are not adapted to use in pumps operating at unusually high temperatures. Pumps used for hot asphalt, cracking still bottoms and similar materials often operate at temperatures at which springs soon lose their temper and need constant replacement.

I have therefore provided the resilient liquid-actuated device indicated at E in Fig. 1 and shown in more detail on an enlarged scale in Fig. 2, for replacing springs and for holding the packing ring in contact with the socket ring during the suction stroke.

Referring to Fig. 2, 12 is a vertical section through one side of the packing ring. In the lower end of this ring I form a plurality (three or more) of cylindrical sockets or chambers 20, these chambers being evenly spaced around a circle concentric with the circumference of the ring and being strictly parallel to its longitudinal axis. Between the inner end of the packing ring and the bottom of the surrounding box I place a floating ring composed of the mating portions 21a and 21b, these halves being joined to form a single ring by screws 22. On the upper half of the ring I form the studs 23, equal in number to the chambers 20 and exactly aligned therewith. These studs function as pistons and the chambers as pressure cylinders, and the assemblage of pistons carried by the floating ring must slip smoothly and substantially non-leakably into the assemblage of cylinders or chambers formed in the end of the packing ring, together these forming an aligning means between the floating and packing rings and also a reservoir of lubricant. It is evident that the greater the pumpward thrust the better the floating ring will be supplied with lubricant.

In the mating faces of the half rings 21a and 21b and in a circle which would pass through the centers of the studs 23 I form grooves which, when assembled, form a continuous circular channel for the passage of liquid. A small hole 24 is drilled longitudinally through each stud, communicating with this channel and permitting the actuating liquid to pass into and out of all the cylinders 20 in unison.

Through one side of the assembled ring, the halves of which must be so joined as to avoid leakage through the joint, I drill and tap a hole 25 communicating with the channel 37. A small but heavy walled steel tube 26, such for instance as a piece of ¼" cold rolled steel rod drilled longitudinally with a 1/16" hole, is screwed into the opening 25. This tube passes through the wall of the packing box and is movably retained therein by a gland 27 and a ring of soft packing 28. This packing must substantially prevent leakage from the pump barrel and must be adapted to permit tube 26 to slide through it longitudinally to allow for lateral movement of the floating ring in unison with the lateral movement of the packing ring 12.

The outer end of tube 26 is placed in communication with a reservoir of liquid under resilient pressure. This reservoir may be any small closed vessel in which an actuated liquid is retained beneath an elastic cushion of compressed air, as in the equalizing chamber of a piston pump. Thus in Fig. 2, 29 is a vessel of say one gallon capacity provided with a pressure gauge 30 and a gauge glass 31. A pipe 32 controlled by a cock 33 communicates with an air pressure main or other source of supply of air under pressure.

The liquid supply in the reservoir is maintained by feeding at intervals through a conventional hand pump cylinder lubricator, provided with the hand pump 35 and with an opening 36 for placing liquid in the lubricator tank. The quantity of liquid consumed is inappreciable, being only that required to compensate leakage around the pistons 23.

In operation, the liquid under pressure in the vessel 29 fills tube 26, channel 37, passages 24 and such parts of the chambers 20 as are not occupied by the pistons. The packing ring is thus urged by fluid pressure toward the arcuate bearing 17 and held in firm but resilient contact therewith. There being substantially no end play of the packing ring there is little or no movement of fluid through the passages except as leakage takes place, for which reason all the passages may be of very small diameter.

The actuating liquid may be any liquid which is permanent at the temperatures assumed, such for instance as glycerine or a high boiling viscous lubricating oil. Such liquids are also suitable for use in lubricating the moving parts, as below described.

I have further provided means by which the same arrangement of parts may be utilized for the lubrication of the sliding surfaces of the packing ring and of the socket ring. To this end I provide grooves in the ends of these rings, parallel to the circumference, as indicated at 38 and 39. From any one of the chambers 20 I drill a passage 40 communicating with the channel 39 and through the length of the socket ring I drill a passage 41 between the channels 38 and 39. Through these passages and through tube 26 and passage 24 the lubricating liquid makes its way into channels 38 and 39 and is thus introduced into the joint between the mutually sliding surfaces indicated at 17 and 18.

For the purpose of lubricating the interior surface of the packing ring, which is desirable in some cases, I form a narrow circumferential groove 42 around the interior of the ring, preferably about intermediate its length, and drill a passage connecting this groove with the longitudinal channel 40.

Where the above lubricating grooves and channels are provided and particularly where lubricant is supplied to the interior surface of the packing ring as last said, the consumption of liquid will be greater than where it is used solely for retaining the ring in position. In such cases it may be desirable to use a somewhat larger reservoir and a pump of greater capacity than the hand pump above described. The class of liquids above referred to is suited to the lubrication of the described sliding parts, though any other or preferred lubricant may be used, so long as it is sufficiently fluid at the working temperature of the pump to move through the narrow channels at the pressure required to hold the packing ring in advanced position.

I claim as my invention:

1. In a pump rod packing having a cylindrical box about said rod, a gland closing the outer end of said box, a socket ring engaging said gland on an arcuately curved face and a packing ring engaging said socket ring on a plane face; means for urging said packing ring toward said gland, comprising: a plurality of longitudinal cylindrical sockets formed in the body of said ring and at the end thereof opposite said gland; a piston slidably fitted within each said socket and adapted to react against a shoulder formed at the inner end of said box, and means for conducting a liquid under pressure into each said socket.

2. In a pump rod packing having a cylindrical box about said rod, a gland closing the outer end of said box, a socket ring engaging said gland on an arcuately curved face and a packing ring engaging said socket ring on a plane face, a floating ring between said packing ring and the box, means on the packing ring for slidably engaging the floating ring, aligning the latter therewith and storing a supply of lubricant, means on the floating ring for engaging the receiving and aligning means on the packing ring, means for both supplying lubricant under pressure to the floating ring and preventing said ring from rotating, and means for distributing lubricant to the socket ring and pump rod whatever their operating alignment may be.

3. A pump rod packing as in claim 2 in which the means on the packing ring adapted to align the floating ring is a plurality of sockets bored into the pumpward end of the packing ring, and the aligning means upon the pump ring cooperating with the aligning means on the packing ring, is a plurality of studs adapted to slidably fit the said sockets.

In witness that I claim the foregoing I have hereunto subscribed my name this 10th day of May, 1930.

WILLIAM J. MacARTHUR.